(12) United States Patent
Yalcinalp et al.

(10) Patent No.: US 9,692,721 B2
(45) Date of Patent: Jun. 27, 2017

(54) INVITATIONS FOR ESTABLISHING RELATIONSHIPS

(71) Applicant: Adobe Systems Incorporated, San Jose, CA (US)

(72) Inventors: Lutfiye Umit Yalcinalp, San Francisco, CA (US); John A. Trammel, Bothell, WA (US); Shyama P. Padhi, Union City, CA (US); Christian Elgart, Boulder, CO (US); Jason M. Copeland, Bothell, WA (US); Alexandru Rosiu, Bucharest (RO); Daniel C. Brotsky, Berkeley, CA (US); Andrei Kalfas, Bucharest (RO)

(73) Assignee: Adobe Systems Incorporated, San Jose, CA (US)

( * ) Notice: Subject to any disclaimer, the term of this patent is extended or adjusted under 35 U.S.C. 154(b) by 687 days.

(21) Appl. No.: 13/849,392

(22) Filed: Mar. 22, 2013

(65) Prior Publication Data

US 2014/0289340 A1 Sep. 25, 2014

(51) Int. Cl.
*G06F 15/16* (2006.01)
*H04L 12/58* (2006.01)

(52) U.S. Cl.
CPC ........ *H04L 51/32* (2013.01); *H04L 2463/101* (2013.01); *H04L 2463/102* (2013.01)

(58) Field of Classification Search
CPC ......... H04L 2463/101; H04L 2463/102; H04L 51/32; G06Q 30/00; G06Q 30/0222; G06Q 30/0253
See application file for complete search history.

(56) References Cited

U.S. PATENT DOCUMENTS

| | | | | |
|---|---|---|---|---|
| 2006/0184997 A1* | 8/2006 | La Rotonda | ........... | G06Q 10/10 726/2 |
| 2007/0019616 A1* | 1/2007 | Rantapuska | ........ | H04L 12/1822 370/352 |
| 2009/0177752 A1* | 7/2009 | Himmelstein | ....... | G06Q 10/107 709/206 |
| 2009/0177977 A1* | 7/2009 | Jones | ..................... | G06N 3/006 715/753 |
| 2010/0319062 A1* | 12/2010 | Danieli | .............. | H04L 12/1818 726/7 |
| 2012/0110087 A1* | 5/2012 | Culver | ................ | G06F 17/5004 709/205 |

\* cited by examiner

*Primary Examiner* — Krisna Lim
(74) *Attorney, Agent, or Firm* — Wolfe-SBMC

(57) ABSTRACT

Techniques for invitations for establishing relationships are described. In at least some embodiments, an architecture is implemented which provides simple and integrated ways for establishing relationships between various entities. The architecture includes invitations that can be used to invite users to establish relationships with entities. A user that receives an invitation can interact with the invitation, such as to accept or decline an invitation to establish a relationship with an entity. If a user accepts an invitation, a relationship can be established between the user and an inviting entity. In at least some embodiments, the relationship can enable the user to perform various actions and/or access resources associated with the entity.

18 Claims, 10 Drawing Sheets

INVITATIONS FOR ESTABLISHING RELATIONSHIPS

BACKGROUND

A variety of different entities exist with which individuals may interact, such as educational institutions, enterprises, government organizations, and so forth. Further, an individual may interact with a particular entity based on the individual's relationship to the entity.

For instance, consider a reseller that purchases goods and/or services from a provider (e.g., a manufacturer) and resells the goods and/or services to a customer organization. In such a scenario, different relationships can be established between the various entities involved. For instance, an individual associated with the customer organization can be authorized to offer access to the goods and/or services to other individuals associated with the customer organization, such as employees. Another individual associated with the customer organization may be entitled to accept access to the goods and/or services, but may not be entitled to offer such access to others. Thus, different relationships can be established that are associated with different permissions and responsibilities.

Current techniques for establishing and managing such relationships typically require onerous amounts of manual configuration to establish such relationships. Further, once a relationship is established, it is typically difficult to make changes to the relationship, such as changes to permissions associated with the relationship.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for invitations for establishing relationships are described. In at least some embodiments, an architecture is implemented which provides simple and integrated ways for establishing relationships between various entities. The architecture includes invitations that can be used to invite users to establish relationships with entities. A user that receives an invitation can interact with the invitation, such as to accept or decline an invitation to establish a relationship with an entity. If a user accepts an invitation, a relationship can be established between the user and an inviting entity. In at least some embodiments, the relationship can enable the user to perform various actions and/or access resources associated with the entity.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
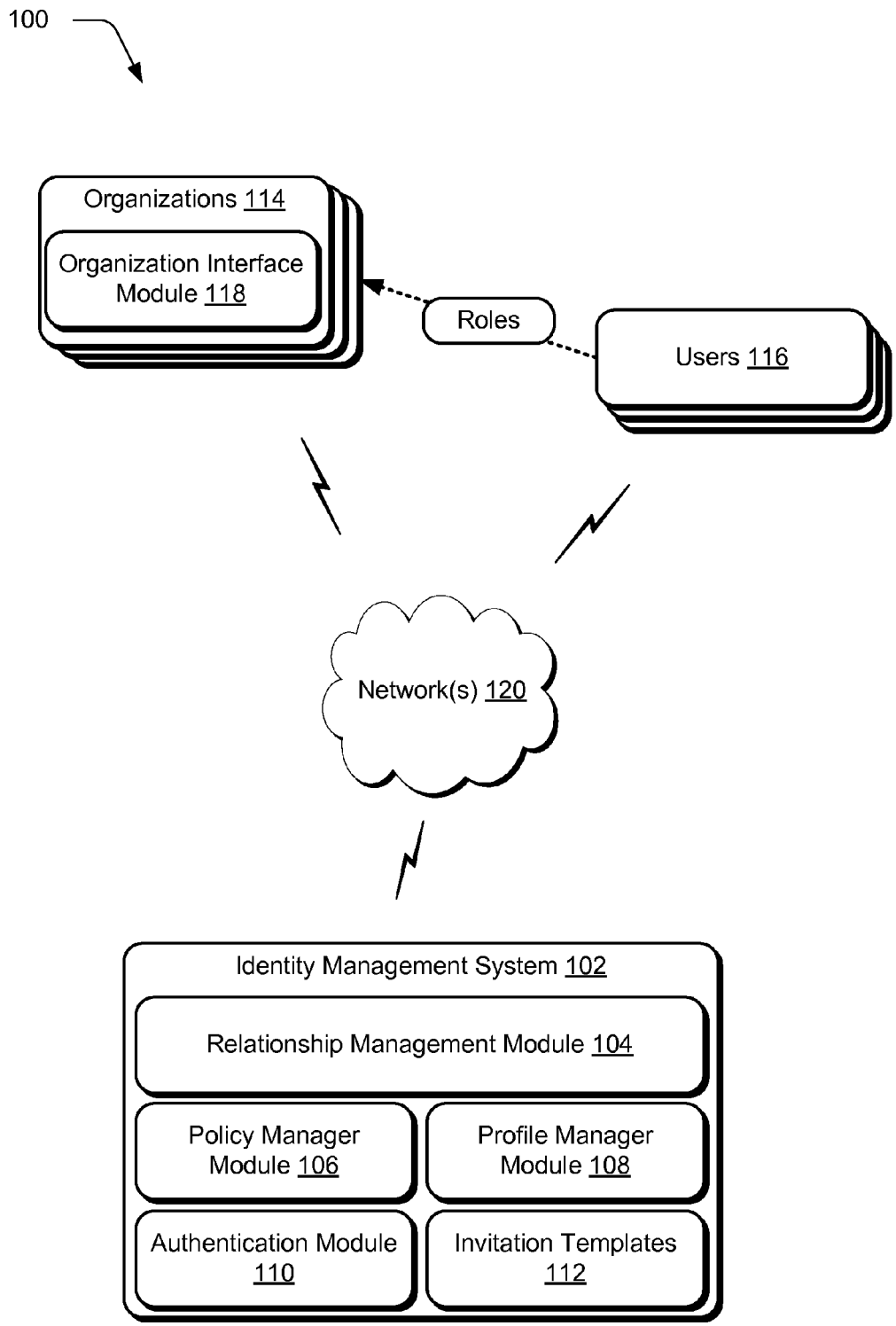
FIG. 1 is an illustration of an environment in an example implementation that is operable to employ techniques discussed herein in accordance with one or more embodiments.

Techniques for invitations for establishing relationships are described. In at least some embodiments, an architecture is implemented which provides simple and integrated ways for establishing relationships between various entities. Generally, a relationship refers to a set of policies for interaction between a user and an entity involved in the relationship. For instance, a relationship can be associated with a set of permissions, such as actions that a user is permitted to perform, resources that a user is permitted to access, and so forth. A relationship can also be associated with a set of constraints, such as actions that a user is not permitted to perform, resources that a user is not permitted to access, and so forth.

The architecture includes invitations that can be used to invite users to establish relationships with entities. As discussed herein, a user generally refers to individuals that can interact with entities in various capacities. A wide variety of different entities can utilize techniques discussed herein, such as enterprise entities, educational entities, government entities, and so on. Thus, an entity can send an invitation to a user inviting the user to participate in a relationship with the entity.

In at least some embodiments, invitations can be generated based on pre-configured invitation templates. Different templates, for example, can be associated with different policies, such as policies that specify behavior for a template, policies that specify usage parameters for a particular relationship, and so on. In at least some embodiments, an invitation can be implemented as an electronic form, such as an email or other electronic document that can be sent to a user.

A user that receives an invitation can interact with the invitation, such as to accept or decline an invitation to establish a relationship with an entity. Further to acceptance of an invitation, a user may be prompted to accept certain policies specified for a relationship. An invited user may also participate in authentication procedures to verify the identity of the user. If a user consents to the policies and/or passes authentication procedure(s), a relationship can be established between the user and an inviting entity. In at least some embodiments, the relationship can enable the user to perform various actions and/or access goods and/or services associated with the entity.

As just one example implementation of the techniques discussed herein, consider a reseller that sells goods and/or services to customer organizations. The reseller sends an invitation to a user associated with a customer organization, inviting the user to establish a reseller-customer relationship with the reseller. The user accepts the invitation according to techniques discussed herein, establishing a reseller-customer relationship between the reseller and the customer organization. The reseller-customer relationship includes various permissions, such as enabling the user to order goods and/or services from the reseller.

Further to the example implementation, the user then invites other users (e.g., employees of the customer organization) to establish user relationships with the customer organization for purpose of accessing goods and/or services provided by the reseller. Establishing the user relationship can enable the other users to access the goods and/or services, but may not enable the other users to invite additional users to establish such a relationship. Thus, different relationships can be associated with different policies such that different custom interactions can be specified via techniques discussed herein.

In the following discussion, an example environment is first described that is operable to employ techniques described herein. Next, a section entitled "Example Procedures" describes some example methods in accordance with one or more embodiments. Following this, a section entitled "Example Graphical User Interfaces" describes some example graphical user interfaces in accordance with one or more embodiments. Next, a section entitled "Example Implementation Scenario" describes an example implementation scenario in accordance with one or more embodiments. Following this, a section entitled "Example Data Model" describes some elements of an example data model for implementation of techniques discussed herein in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for invitations for establishing relationships. Environment 100 includes an identity management system 102, which is representative of an entity that can establish and manage various relationships with other entities. Example implementations of the identity management system 102 include an enterprise organization that can provide goods and/or services, an educational organization, a government organization, a charitable organization, and so forth. Alternatively or additionally, the identity management system 102 can represent a service that can broker relationships between other entities.

The identity management system 102 includes various functionalities for performing techniques discussed herein. For instance, a relationship management module 104 is included, which is representative of functionality to enable the identity management system 102 to perform various tasks, such as inviting users to establish relationships with the identity management system 102, managing relationships between users and the identity management system 102, and so on. The relationship management module 104 can present various graphical user interfaces (GUIs) that can receive user input to perform tasks discussed herein. Further aspects of such GUIs are detailed below.

A policy manager module 106 is included, which is representative of functionality to configure and manage policies discussed herein. Policies can include usage policies that govern terms and conditions under which users may establish relationships with entities. As detailed herein, a user may be required to agree to a set of usage policies before the user may establish a relationship with an entity.

Polices may also include invitation policies that govern various aspects of an invitation life cycle. Examples of invitation policies include how many users may be invited to participate in a particular relationship with an entity, allowed pendency times for unaccepted invitations, specific domains or other organizations that are permitted/not permitted to establish particular relationships, and so forth. A wide variety of different policies and policy types can be created and managed in accordance with embodiments discussed herein.

The environment 100 further includes a profile manager module 108, which is representative of functionality to manage and track identities for various users and/or entities participating in relationships. For example, the profile manager module 108 can track identity information, such as email addresses, internet protocol (IP) addresses, media access control (MAC) addresses, and so forth. The profile manager module 108 may also track contact information for users, such as phone numbers, mailing addresses, enterprise contact information, and so on.

An authentication module 110 is included, which is representative of functionality to confirm an identity of a user and/or entity. For instance, when a user receives an invitation to establish a relationship with an entity (e.g., the identity management system 102) and accepts the invitation, the user can provide various types of authentication information. The authentication module 110 can check the provided authentication information against known information for the user to ascertain whether the user's identity is authenticated. As discussed elsewhere herein, failure of an authentication process can cause a relationship establishment process to fail.

The identity management system 102 includes invitation templates 112, which are representative of electronic forms that can be selected and populated with information to invite users and/or entities to establish various relationships. For instance, the invitation templates 112 can be individually pre-configured to be associated with specific sets of policies, roles, and so forth. Thus, selection of a specific template of the invitation templates 112 can present a pre-configured form that can be populated (e.g., via user input) with information about a specific user or entity. An invitation to establish a particular relationship can be sent to the user or entity based on the information provided to the form, and various behaviors of the invitation can be specified and/or controlled by policies specified for the associated invitation template.

The environment 100 further includes organizations 114, which are representative of different entities that can establish relationships according to techniques discussed herein. For example, individual of the organizations 114 can represent different enterprise entities that cooperate as part of a business relationship, such as a manufacturer, a supplier, a retailer, and so forth. The organizations 114 may also represent divisions of a single organization, such as different schools within a university, different divisions of a single enterprise entity, and so on.

The environment 100 also includes users 116, which are representative of individuals that are associated in various ways with the organizations 114. For example, and as detailed herein, the users 116 can assume various roles in relation to the organizations 114 and can interact with the organizations 114, the identity management system 102, and/or various other entities.

The organizations 114 further include an organization interface module 118, which is representative of functionality to enable the users 116 to interact with the organizations 114, such as to perform tasks and access services associated with the organizations 114. For instance, the users 116 can utilize the organization interface module 118 to perform tasks, such as requesting goods and/or services associated with the organizations 114, making changes to member profiles for the users 116, inviting other users to establish relationships with the organizations 114 and/or the identity management system 102, and so forth.

In at least some embodiments, the organization interface module 118 can provide various GUIs that can receive user input to perform tasks associated with techniques discussed herein. Examples of such GUIs are presented in the discussion below.

While techniques discussed herein can be employed to establish relationships between the identity management system 102, the organizations 114, and/or the users 116, relationships may also be established between the organizations 114 and/or the users 116 themselves independent of the identity management system 102.

The environment 100 further includes one or more networks 120 via which various entities of the environment 100 may communicate. The network(s) 120 may assume a variety of different configurations, such as a local area network (LAN), a wide area network (WAN), the Internet, and so on. Functionalities discussed with reference to the environment 100 and/or other portions of the discussion herein may be implemented in a distributed environment (e.g., "over the cloud"), as further described in relation to FIG. 11. Modules and/or functionalities of the identity management system 102 and/or the organizations 114, for example, may be implemented via cloud services.

Having described an example environment in which the techniques described herein may operate, consider now a discussion of some example implementation scenarios in accordance with one or more embodiments.

Example Procedures

The following discussion describes some example procedures for enrolling organization members via invitations in accordance with one or more embodiments. The example procedures may be employed in the environment 100 of FIG. 1, the system 1100 of FIG. 11, and/or any other suitable environment.

Figure 2:
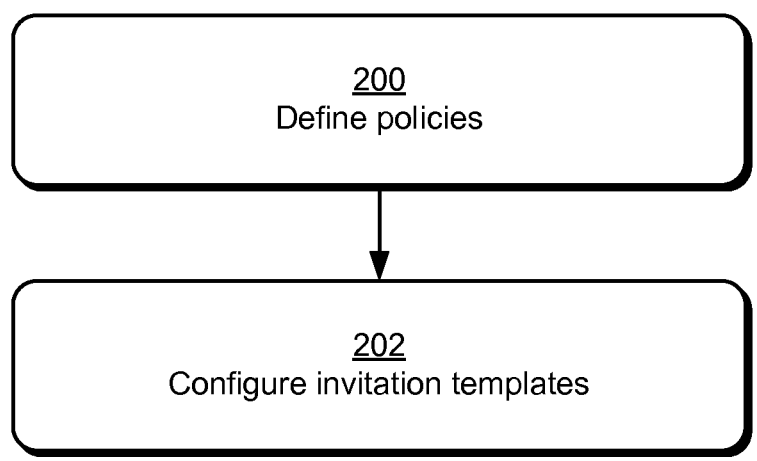
FIG. 2 is a flow diagram that describes steps in a method in accordance with one or more embodiments.

FIG. 2 is a flow diagram that describes steps in a method in accordance with one or more embodiments. In at least some implementations, the method describes an example way for configuring various aspects of invitations for establishing relationships discussed herein.

Step 200 defines policies. Examples of policies include usage policies, such as policies that specify permissible and/or impermissible uses of services and resources, policies that specify permissible and/or impermissible actions and behaviors, and so on. Usage policies can be role-specific, such that different defined user roles can be individually associated with specific sets of usage policies.

Policies may also include invitation policies that specify parameters for inviting entities to establish various relationships. For instance, an invitation policy can set a limit on how many entities may be invited to a particular relationship with a particular entity. The limit may be role-specific, such that different defined roles are associated with different invitation limits.

Another invitation policy may specify a permitted pendency time for an invitation. For instance, an invitation that is not accepted within a permitted pendency time (e.g., 3 days) can expire such that the invitation is no longer valid for acceptance. An attempt to accept an expired invitation can be denied.

Yet another invitation policy can specify a permitted number of invitations that may be accepted. For instance, the policy can specify that the first n invitations that are accepted and authenticated will be granted to establish a particular relationship. Other attempts to accept invitations past the first n acceptances can be denied. As with other policies, this policy can be role-specific such that different roles may have different allowed numbers of acceptances.

Still further, another invitation policy can specify which users may extend valid invitations for other entities to establish relationships. Such a policy can be role-specific, such that some users (e.g., administrators) can invite other users, while other users (e.g., non-administrators) may not. The policy may also indicate specific roles and/or relationships that particular users may invite other users to participate in.

Step 202 configures invitation templates. The invitation templates 112, for example, can be configured and associated with various behaviors and policies. Invitation templates are selectable to generate instances of invitations for inviting users and/or entities to establish various relationships. An example data model that can be utilized to configure different invitation templates is discussed below with reference to FIG. 9.

In at least some implementations, the method described above can be implemented as part of an initial configuration of functionalities for invitations for establishing relationships. Aspects of the method may also be employed to reconfigure various attributes, such as to make changes to existing policies, reconfigure existing templates, and so forth. Thus, techniques discussed herein provide a dynamic mechanism for configuring various attributes of invitations for establishing relationships.

Having discussed an example procedure for defining policies and configuring invitation templates, consider now an example procedure for establishing a relationship between entities.

Figure 3:
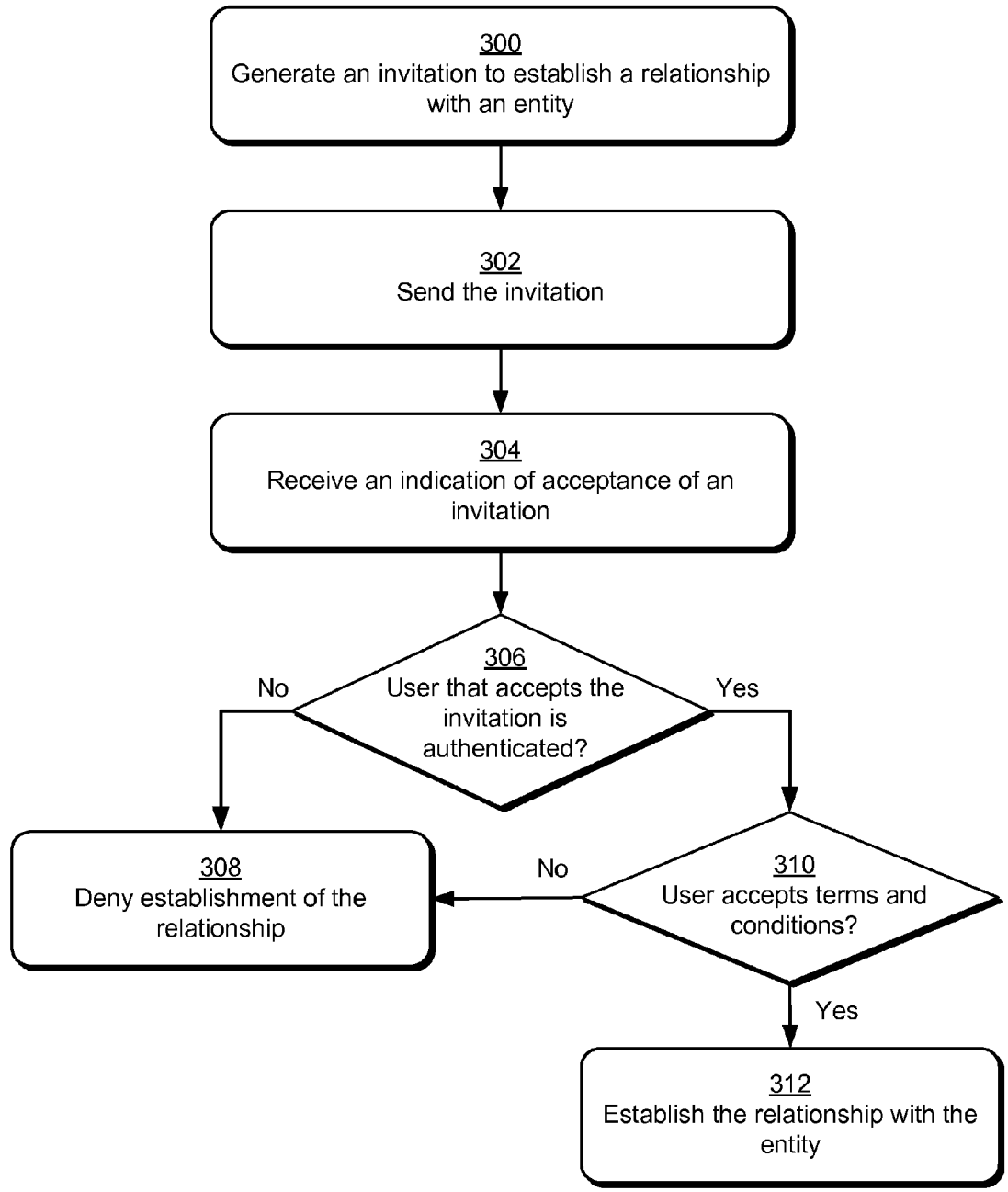
FIG. 3 is a flow diagram that describes steps in a method in accordance with one or more embodiments.

FIG. 3 is a flow diagram that describes steps in a method in accordance with one or more embodiments. Step 300 generates an invitation to establish a relationship with an entity. For example, an administrator associated with an entity (e.g., the identity management system 102) can generate invitations to specific users that, if accepted and authenticated, enable the users to establish a relationship with the entity. For example, one of the invitation templates 112 can be selected. The invitation template can include pre-specified data fields and menus that can be used to provide (e.g., via user input) information about a user and/or other entity being invited.

Step 302 sends the invitation. For instance, when the invitation is generated, contact information for an invited entity can be associated with the invitation. The invitation can be sent to the invited entity via the contact information, such as via email, messaging, and so forth.

Step 304 receives an indication of acceptance of the invitation. A user that receives an invitation, for instance, can provide input indicating acceptance of the invitation. Such input can include a user selection of an acceptance-related control, such as an acceptance hyperlink, an acceptance button, and so on. Examples of such controls are discussed below. Input indicating acceptance of an invitation can include selection of an acceptance hyperlink that navigates to an acceptance webpage, such as via a web browser. The invited user can complete acceptance procedures via the web page, such as performing user authentication.

Step 306 determines whether a user that accepts the invitation is authenticated. Various authentication protocols can be employed to authenticate the identity of a user accepting an invitation, such as two-factor authentication, a password, a challenge and response procedure, email authentication, biometric authentication, and so forth.

In at least some implementations, authentication can include a user signing in to a valid user account for a domain recognized (e.g., accepted) by the inviting entity. Alternatively, authentication can include a user creating a new account with a recognized domain.

If the user is not authenticated ("No"), step 308 denies establishment of the relationship. For instance, if an authentication process fails, the establishment process can be terminated without establishment of the relationship with the inviting entity.

If the user is authenticated ("Yes"), step 310 determines whether the user accepts terms and conditions for the relationship. For example, a user can be presented with an option to accept usage policies, such as terms and conditions that govern a relationship. In at least some implementations, a particular collection of usage policies associated with an invitation can be based on an invitation template used to generate the invitation.

If the user accepts the terms and conditions for the relationship ("Yes"), step 312 establishes the relationship with the entity. The user, for example, can be added to a list of authenticated users who have accepted terms and conditions that govern a particular relationship. For instance, an identifier for the user can be linked to the inviting entity such that the user can be associated with various rights and privileges related to the inviting entity. The user, for example, can be granted various permissions related to the inviting entity, such as access to goods and/or services, permission to invite other users to establish relationships, and so forth. As discussed elsewhere herein, a user's rights and privileges in a particular relationship can be determined by a role associated with the relationship.

If the user does not accept the terms and conditions for the relationship ("No"), the process proceeds to step 308 which denies establishment of the relationship.

Figure 4:
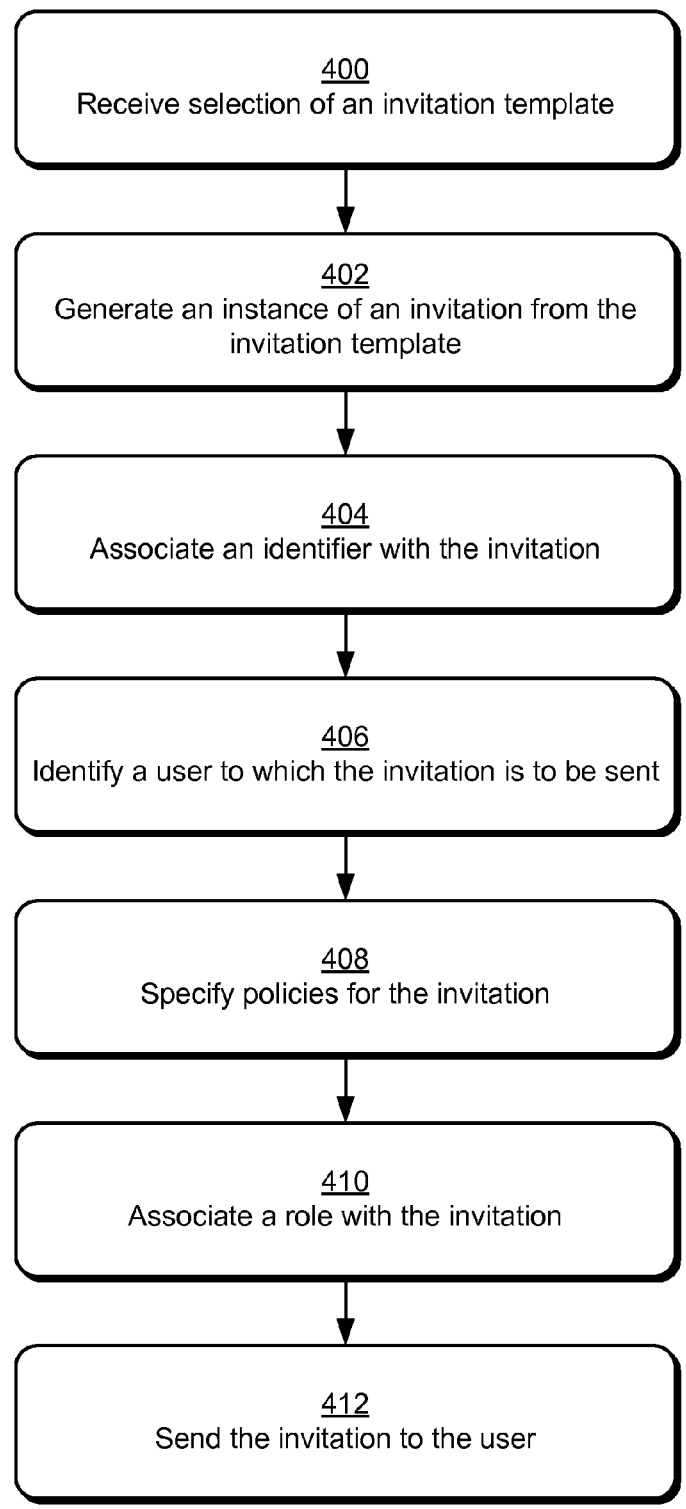
FIG. 4 is a flow diagram that describes steps in a method in accordance with one or more embodiments.

FIG. 4 is a flow diagram that describes steps in a method in accordance with one or more embodiments. In at least some implementations, the method describes an example way for generating invitations to establish relationships, such as discussed with reference to step 300 of FIG. 3.

Step 400 receives a selection of an invitation template. An invitation template, for instance, can be selected from the invitation templates 112. Selection can be made via input to a GUI generated by the relationship management module 104, the organization interface module 118, and so on.

Step 402 generates an instance of an invitation from the invitation template. The invitation, for instance, can be generated as an email document and/or other electronic document that can be completed and forwarded to a user.

Step 404 associates an identifier with the invitation. For instance, the identifier can enable the invitation to be tracked and to be differentiated from other invitations. Various types of identifiers can be utilized, such as a digital object identifier (DOI), a globally unique identifier (GUID), and so on. Techniques discussed herein can leverage the identifier for various purposes, such as to bind an invitation instance to a user to which the invitation is sent, and to policies specified for the invitation.

Step 406 identifies a user to which the invitation is to be sent. An email address and/or other contact information for the user can be associated with the invitation. Authentication information associated with the user may also be associated with the invitation to enable the invitation to be authenticated to the user if the user accepts the invitation. Examples of authentication information include cryptography keys, security tokens (e.g., software and/or hardware), passwords, biometric information, and so on. In at least some embodiments, the authentication information associated with an invitation can be compared to authentication information provided by a user to determine whether the user is authenticated establish a particular relationship.

Step 408 specifies policies for the invitation. In at least some embodiments, policies can be pre-configured for an invitation template, and thus can be automatically specified in response to selection of the invitation template.

Examples of different policies are discussed above. Policies can be invitation-specific such that individual invitations can be associated with unique sets of policies. Policies can also include terms and conditions (e.g., usage policies) for particular relationships that a user is prompted to accept when the user accepts the invitation. For instance, if a user refuses to accept terms and conditions associated with an invitation, the process of establishing a relationship between the user and an inviting entity may terminate.

Step 410 associates a role with the invitation. For instance, the invitation can be generated to invite a user to assume a particular role, such as an administrator, a user, and so forth. As referenced above, an invitation template can be pre-associated with a particular role. Thus, selection of the invitation template can automatically associate a resulting instance of an invitation with the particular role.

Step 412 sends the invitation to the user. As indicated above, the invitation can be send via various means, such as via email, messaging, electronic data interchange (EDI), and so forth.

In at least some implementations, a user that accepts an invitation and is granted a particular relationship can generate subsequent invitations (e.g., utilizing the procedure discussed above) to invite other users to establish relationships. Alternatively or additionally, a member can recycle an accepted invitation. For instance, an invitation that has previously been accepted to establish a relationship (e.g., as discussed above) can be associated with a different user and forwarded to the different user to enable the different user to establish a relationship.

Having discussed some example procedures, consider now a discussion of some example GUIs in accordance with one or more embodiments.

Example Graphical User Interfaces

In accordance with various embodiments, various tasks related to creating and managing an organization can be performed via input to a GUI. For instance, consider the following example GUIs.

Figure 5:
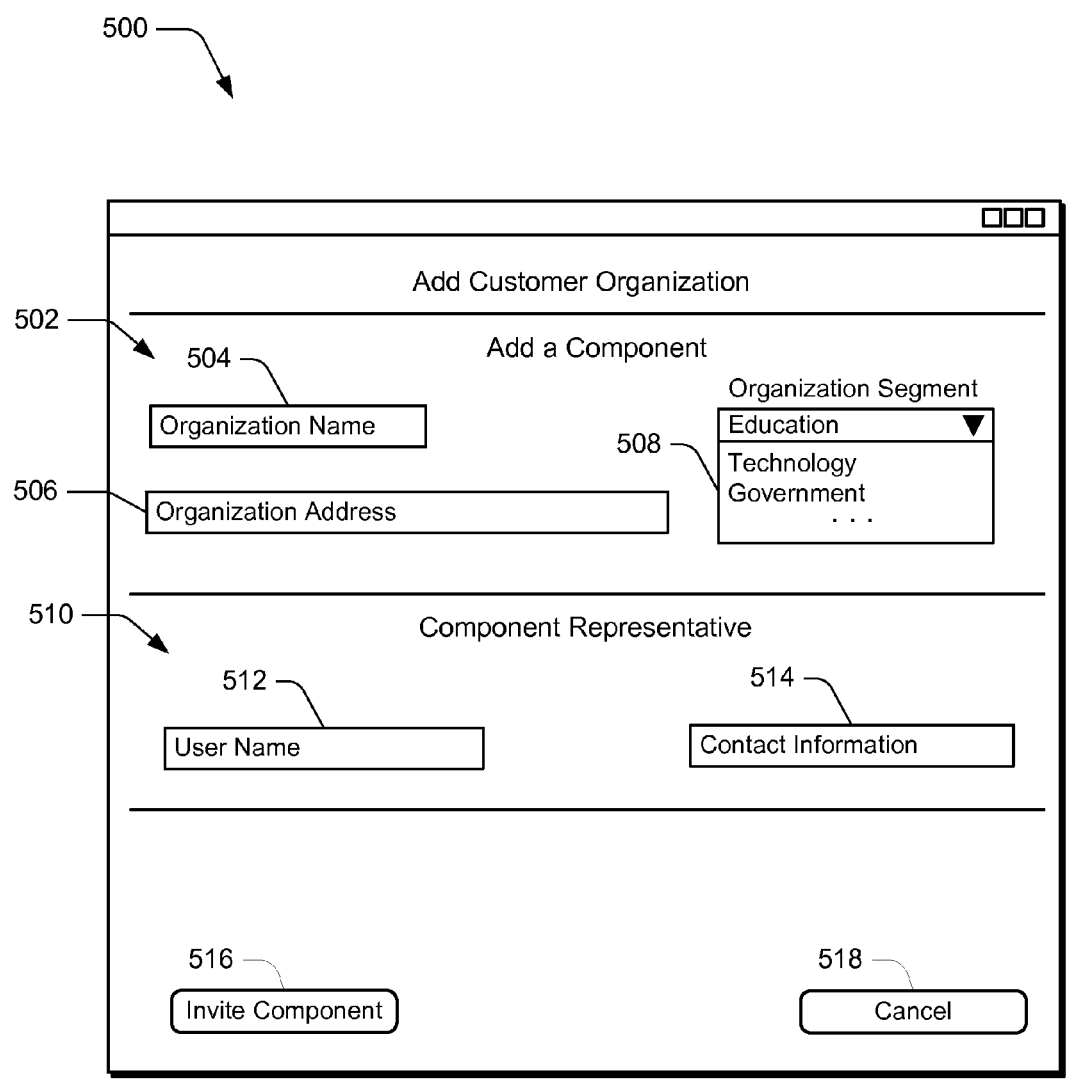
FIG. 5 illustrates an example graphical user interface in accordance with one or more embodiments.

FIG. 5 illustrates an example organization GUI 500 that enables invitations to be generated inviting a user to associate with a particular entity as an organization. The organization GUI 500, for instance, can be generated and/or managed by the relationship management module 104, the organization interface module 118, and so on.

In at least some embodiments, the organization GUI 500 can be presented in response to a selection of one of the invitation templates 112. For example, the different data fields, menus, controls, and so forth associated with the organization GUI 500 can be specified by an associated invitation template. Invitation policies and/or behaviors for an invitation generated from the organization GUI 500 may be pre-specified based on an associated invitation template.

The organization GUI 500 includes an organization information portion 502, which enables information about an organization to be provided. For instance, an organization name field 504 can receive input to indicate a name for the organization being invited. Input to an address field 506 can specify an address for the entity, such as a mailing address, a physical address, and so forth.

A segment menu 508 is further included, which can be used to specify a particular category for an entity being invited. The category, for instance, can refer to a particular market segment, industry, and so forth. In at least some implementations, the segment menu 508 can be implemented as a drop-down menu from which pre-specified categories can be selected.

The organization GUI 500 further includes an organization user portion 510, which enables information to be specified for an individual to which the invitation will be sent. For instance, a user name field 512 can be used to specify a name for a user that represents an organization, such as a first name, last name, and so forth.

A contact information field 514 can be used to specify contact information for the user. For example, an email address for the user can be provided such that the invitation can be emailed to the representative. Various other types of contact information can alternatively or additionally be provided to the contact information field 514.

The organization GUI 500 also includes an invite control 516, which is selectable to send an invitation to the specified organization. For example, selecting the invite control 516 can cause the invitation to be sent to the individual identified in the organization user portion 510, such as via contact information provided to the contact information field 514.

A cancel control 518 is also provided, which is selectable to cancel configuration of the invitation. For example, selecting the cancel control 518 can cause the various fields and menus of the organization GUI 500 to be cleared, and/or the organization GUI 500 to be closed.

Figure 6:
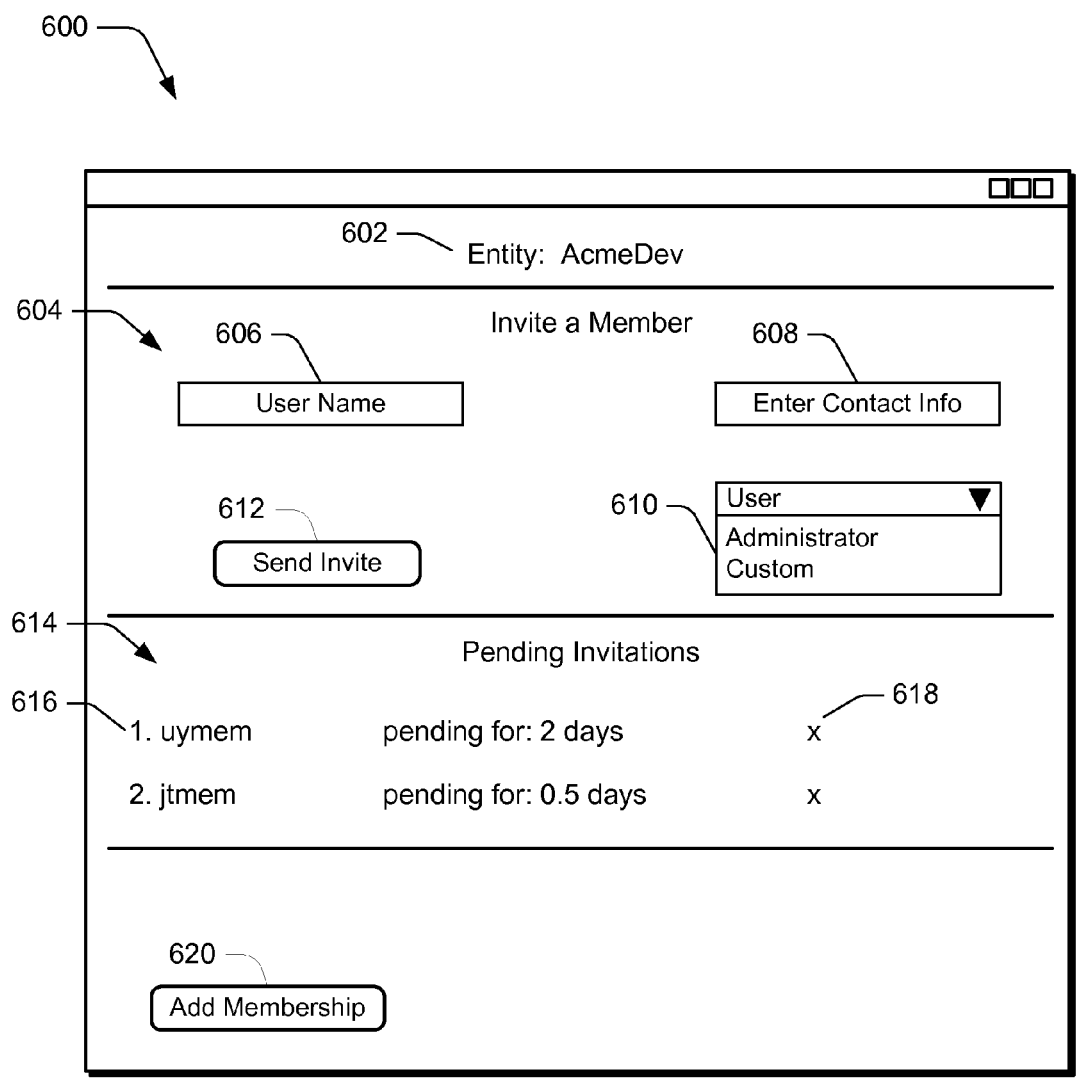
FIG. 6 illustrates an example graphical user interface in accordance with one or more embodiments.

FIG. 6 illustrates an example member GUI 600 that enables invitations to become members of an organization to be generated and sent to users. The member GUI 600, for instance, can be generated and/or managed by the organization interface module 118. Invitations generated via interaction with the member GUI 600 can enable the users 116 to establish a relationship with the organizations 114, such as in a particular role with respect to the organizations 114. For example, a member relationship established via the member GUI 600 can enable a member to access goods and/or services provided by an entity with which an organization has a relationship.

In at least some embodiments, the member GUI 600 can be presented in response to a selection of one of the invitation templates 112. For example, the different data fields, menus, controls, and so forth associated with the member GUI 600 can be specified by an associated invitation template. Invitation policies and/or behaviors for an invitation generated from the member GUI 600 may be pre-specified based on an associated invitation template.

The member GUI 600 includes an entity ID portion 602, which identifies a particular entity associated with the member GUI 600. For instance, the member GUI 600 can be associated with a particular organization, and an entity identified in the entity ID portion 602 can correspond to an entity with which the organization has a relationship.

An invitation configuration portion 604 includes data fields and controls for configuring an invitation. For instance, the configuration portion 604 includes a user name field 606 in which a name for the prospective member can be entered. The user name, for example, can correspond to the user's legal name, a nickname for the user, and so forth. In at least some embodiments, a user name entered in the member name field 606 can be used to track invited members, established members, and so forth.

The configuration portion 604 further includes a contact info field 608 that can be used to enter contact information for a user to be invited. For instance, an email address can be entered into the contact info field 608 to enable an invitation to be sent via email. However, other types of contact information may be entered into the contact info field 608 in accordance with various embodiments.

A role menu 610 is further included, which enables a role to be specified for a prospective member. As discussed above, different roles may be associated with different rights and responsibilities in a particular organization. While some roles may be preconfigured with specific rights and responsibilities, custom roles may also be generated. For instance, selection of the "custom" option from the role menu 610 can cause a customization GUI to be presented that enables an inviting member to specify custom policies, permissions, responsibilities, and so forth for a prospective member.

The configuration portion 604 also includes a send control 612, which is selectable to send an invitation to a prospective member. For instance, selection of the send control 612 can cause an invitation to be automatically generated and formatted according to various configuration information provided to the configuration portion 604, and automatically sent via contact information entered into the contact info field 608.

The member GUI 600 further includes a pending invitations section 614, which identifies invitations that have been sent and are pending acceptance. For example, a pending invitation 616 indicates that an invitation sent to "uymem" has been pending for 2 days. The pending invitation 616 includes a cancel control 618 that is selectable to cancel (e.g., withdraw) the pending invitation 616.

In at least some embodiments, indicia of pending invitations (e.g., the pending invitation 616) are selectable to configure and/or change various parameters of a pending invitation. For instance, selection of the pending invitation 616 can cause the configuration portion 604 to be presented and automatically populated with information from the pending invitation 616. Changes and/or customizations to the pending invitation 616 can then be made via input to the configuration portion 604. Thus, in at least some embodiments, changes can be made to an invitation after the invitation has been sent to a prospective member.

Also included as part of the member GUI 600 is an add membership control 620 that is selectable to add a membership seat to an organization. For example, in at least some organizations, inviting a new member requires that a membership seat be available for the new member. Thus, inviting new members in such organizations may be predicated on an availability of an open membership seat. In one or more embodiments, if an open membership seat is not available, the configuration portion 604 can be disabled such that new members cannot be invited. In such a scenario, the configuration portion may become re-enabled if a membership seat becomes available.

If an open (e.g., unfilled) membership seat is not available in such an organization, a new membership may be added. For example, a new membership may be added by simply requesting the new membership, such as by selecting the add membership control 620. In at least some embodiments, however, adding a new membership may be predicated on certain criteria being met, such as a membership fee being paid. For instance, selection of the add membership control 620 can cause a prompt to be provided that enables a member and/or other entity to pay a fee to add a new membership seat.

In one or more implementations, the member GUI 600 can be utilized by an administrator and/or other user to invite other individuals to become members. For instance, a representative of an organization invited via the organization GUI 500 discussed above can be automatically associated as an administrator. As an administrator, the representative can be permitted to access the member GUI 600 to invite other members.

Figure 7:
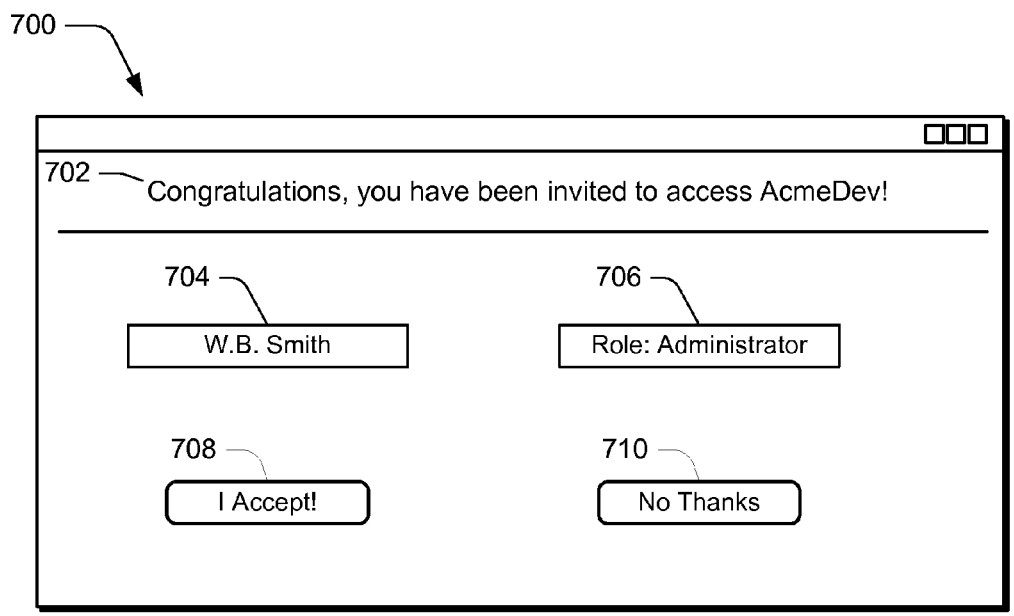
FIG. 7 illustrates an example graphical user interface in accordance with one or more embodiments.

FIG. 7 illustrates an example invitation GUI 700 that can be presented to a user being invited to establish a relationship with an entity. For example, the invitation GUI 700 can be presented to an administrator of one of the organizations 114 to enable the organization to establish a relationship with the identity management system 102. In at least some embodiments, the invitation GUI 700 represents an implementation of the invitations discussed herein. The invitation GUI 700, for instance, can be presented in response to a user opening a received invitation, such as an invitation email, invitation hyperlink, and so on.

The invitation GUI 700 includes an announcement portion 702, which indicates that the user has been invited to establish a particular relationship with an inviting entity. A name portion 704 displays a name of the invited user, and a role portion 706 displays a role for which the user is being invited.

An acceptance control 708 is included, which can be selected to indicate acceptance of the invitation. Selection of the acceptance control 708 can cause a user to be presented with other relationship-related procedures, such as authentication procedures, terms and conditions acceptance procedures, sign-up procedures, and so on.

The invitation GUI 700 further includes a decline control 710, which can be selected to decline the invitation. For example, selection of the decline control 710 can cause a message to be sent to an inviting entity indicating that the user has declined the invitation.

Figure 8:
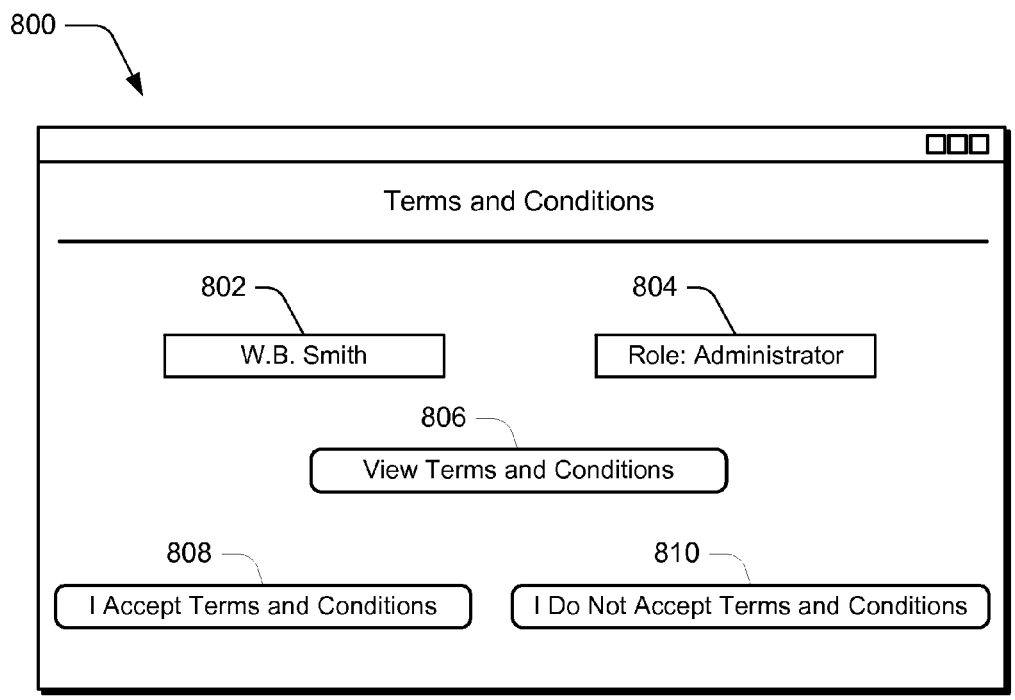
FIG. 8 illustrates an example graphical user interface in accordance with one or more embodiments.

FIG. 8 illustrates an example terms and conditions GUI 800 that can be presented to a user being invited to establish a relationship with an entity. The terms and conditions GUI 800, for example, can be presented in response to a user accepting an invitation and/or a user being authenticated after accepting an invitation.

The terms and conditions GUI 800 includes a name portion 802 which displays a name of the invited user, and a role portion 804 that displays a role for which the user is being invited.

A view terms indicia 806 is included, which is selectable to present the user with a list and/or other representation of policies that govern various aspects of a relationship. The view terms indicia 806, for instance, can be implemented as a hyperlink that is selectable to cause a window or other GUI to be presented that includes the policies.

The terms and conditions GUI 800 further includes an accept terms indicia 808, which is selectable to indicate that the user accepts policies associated with the relationship, e.g., policies presented in response to selection of the view terms indicia 806.

A decline acceptance control 810 is further included, which is selectable to indicate that the user does not accept policies associated with the relationship. Selection of the decline acceptance control 810, for example, can terminate a procedure for establishing a relationship such that the relationship is not established.

The various fields, controls, and so forth discussed with reference to the GUIs discussed herein are presented for purpose of example only, and it is to be appreciated that various GUIs employed further to techniques discussed herein can be configured in a variety of different ways in accordance with the claimed embodiments.

Having discussed some example GUIs, consider now an example implementation scenario in accordance with one or more embodiments.

Example Implementation Scenario

Figure 9:
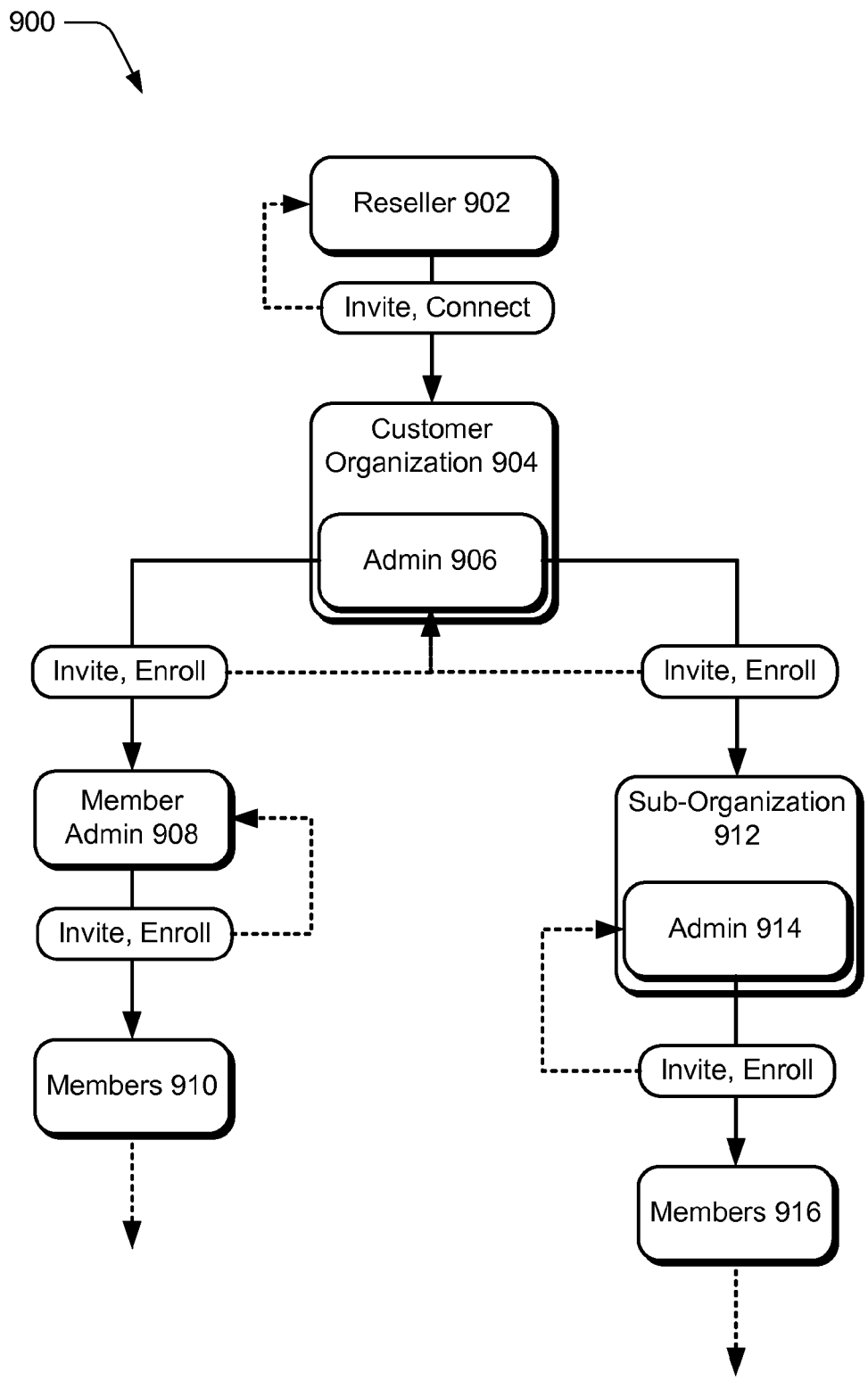
FIG. 9 illustrates an example implementation scenario in accordance with one or more embodiments.

FIG. 9 illustrates an example implementation scenario, generally at 900. The scenario 900 illustrates that techniques discussed herein can be utilized to create different types of relationships between different entities such that custom relationship structures can be generated.

The scenario 900 presents an example implementation where a reseller 902 offers goods and/or services to various customer organizations. These particular entities are presented for purpose of example only, and techniques discussed herein may be employed in a wide variety of different scenarios and with a wide variety of different entities.

In the scenario 900, the reseller 902 creates a customer relationship connection with a customer organization 904. For instance, invitation and acceptance procedures discussed above can be utilized to create the customer relationship. As part of creating this relationship, an administrator 906 is designated for the customer organization 904. The administrator 906, for example, can receive an invitation from the reseller 902, and can complete acceptance procedures such that the administrator 906 serves as a representative of the customer organization 904 for the reseller 902.

Further to the scenario 900, policies associated with the administrator relationship between the administrator 906 and the reseller 902 enable the administrator 906 to authorize various transactions. For instance, the administrator 906 may enable other individuals associated with the customer organization 904 to access to goods and/or services provided by the reseller 902.

The administrator 906 may also be authorized to invite other individuals to become administrators. For instance, further to the scenario 900, the administrator 906 invites and enrolls a member administrator 908 as part of the customer organization 904. This can enable the member administrator 908 to access goods and/or services provided by the reseller 902, as well perform administrator functions. For instance, the member administrator 908 invites and enrolls members 910 as part of the customer organization 904. This enables the members 910 to access goods and/or services provided by the reseller 902. In at least some embodiment, however, policies for the member relationship between the members 910 and the customer organization 904 do not enable the members 910, 912 to invite other members.

In the scenario 900, the administrator 906 further invites and connects a sub-organization 912 with the customer organization 904. The sub-organization 912, for example, can represent a department within the customer organization 904, an affiliate of the customer organization 904, and so on. An administrator 914 for the sub-organization 912 is designated to perform various tasks. For instance, the administrator 914 invites and enrolls members 916 in the sub-organization 912, such to access goods and/or services provided by the reseller 902 and through the customer organization 904.

As indicated by the dashed arrows included in the scenario 900, techniques discussed herein are recursive in nature such that a variety of different relationships and relationship structures can be created. For example, relationships can be established between an organization and multiple sub-organizations, and members can be added to the organization and the sub-organizations in a recursive fashion to create a customized relationship structure. Thus, the relationship structure illustrated in the scenario 900 can be expanded both in terms of individuals added as members, and in terms of organizations and sub-organizations that can be associated with one another via techniques discussed herein.

According to various embodiments, different relationships created utilizing techniques discussed herein can be independent of one another such that various relationship structures and sub-structures can be generated. For instance, with reference to the scenario 900, the reseller 902 may manage and/or control various aspects of its relationship with the customer organization 904. In turn, the customer organization 904 may manage and/or control relationships with its members, sub-organizations, and so forth, independent of the reseller 902. Thus, techniques discussed herein can enable a variety of different relationships and relationship structures to be created.

The relationship structures and interactions discussed with reference to the scenario 900 are presented for purpose of example only, and a wide variety of different relationship structures and interactions can be implemented within the spirit and scope of the claimed embodiments.

Having discussed an example implementation scenario, consider now an example data model in accordance with one or more embodiments.

Example Data Model

Figure 10:
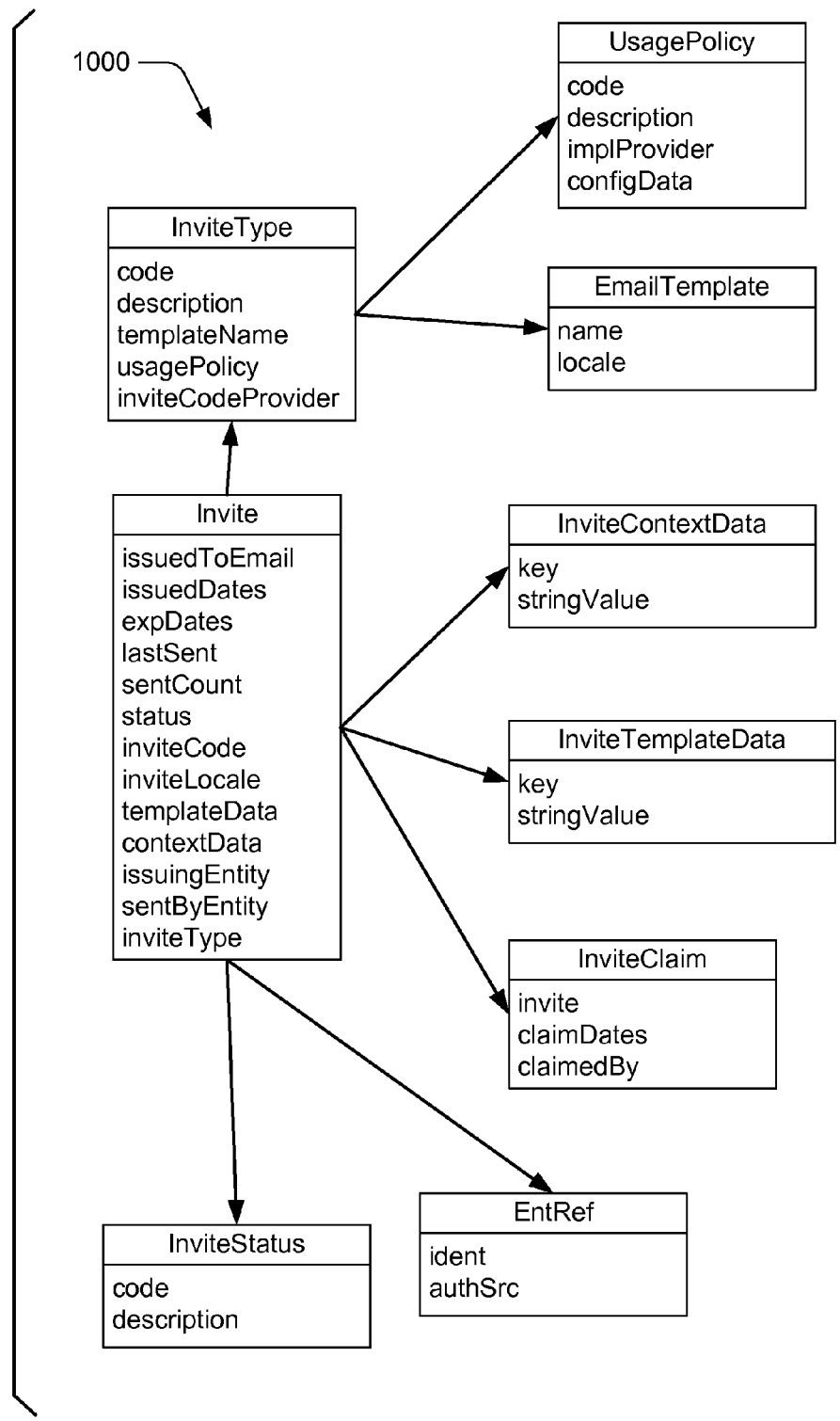
FIG. 10 illustrates elements of an example data model in accordance with one or more embodiments.

FIG. 10 illustrates an example data model 1000 that can be employed to implement techniques discussed herein. The data model 1000 includes various entities and data types for the entities that drive a configurable invitation mechanism for generating, tracking, and managing various aspects of invitations discussed herein. The entities are representative of abstract data representations, such as data classes, objects (e.g., implementations of classes), and so on.

The data model 1000 includes an Invite entity, which in turn includes multiple attributes that are configurable to define and track various aspects of an invitation. These attributes are as follows:

issuedToEmail: This attribute specifies an email address to which an invitation is sent. In at least some embodiments, an invitation for a specific individual and/or role may have a policy that indicates that the invitee must be from a specific domain and/or associated with a particular component. Thus, when a specific invitation is created, the policy may dictate that the invitee indicated by "issuedToEmail" must be from a specific domain and/or associated with a specific component.

issuedDates: This attribute indicates a date on which a particular invitation is issued.

expDates: This attribute indicates a date on which a particular invitation expires.

lastSent: This attribute indicates a date on which a particular invitation was most recently sent to an invitee.

sentCount: This attribute indicates a number of times that an invitation is sent.

status: This attribute indicates a current status of an invitation, such as unsent, sent, pending acceptance, accepted, cancelled, and so forth.

inviteCode: This attribute indicates a unique identifier for an invite instance.

inviteLocale: This attribute indicates a locale, used for communications, by the invite instance.

templateData: This attribute includes the actual values that are used to fill an invitation template, such as information for an invitee.

contextData: This attribute tracks information regarding the configuration and usage of an instance of an invitation. Information from the attribute, for example, can be accessed to ensure that a particular invitation complies with invitation-related policies.

issuingEntity: The attribute indicates an entity that issues the invitation, such as an organization, a member of an organization, and so on. An issuing entity may not actually send an invitation, but may make an invitation available to be sent.

sentByEntity: This attribute indicates an entity that sends an invitation to an invitee, such as an administrator, an organization, a member of an organization, and/or other entity that sends an invitation.

inviteType: This attribute indicates a type for an instance of an invitation. For example, different invite types can be specified based on various invitation attributes, such as different member roles, invitation policies, and so on. In at least some implementations, different invite types can be associated with respective invitation templates which can be invoked to generate corresponding invitation instances. Different invite types may also have associated invitation policies, such that custom invitation policies can be set for individual invite types.

According to various embodiments, the attributes discussed above include data elements that define particular instances of invitations. A non-exhaustive list of examples of such data elements is presented below.

InviteType—this attribute includes the following data elements:

code: This attribute uniquely identifies an invite type.

description: This data element includes a description of an invite type, such as a text description.

templateName: This data element indicates a name for an invitation template used to generate an instance of an invitation. As referenced above, templates can be generated for different types of invitations, and can be used to generate individual instances of invitations.

usagePolicy: This data element indicates invitation-related policies that govern various aspects of an invitation life cycle. Policies defined by usagePolicy can be checked against actual attributes of an instance of an invitation (e.g., as indicated by contextData) to verify that the invitation complies with applicable policies. Examples of such policies are discussed above.

inviteCodeProvider: This attribute identifies a system or object that provides for the generation of inviteCodes for the inviteType.

InviteContextData—this attribute includes key and string Value data elements for locating values for the attribute, such as in a hash table. This attribute defines portions of an invitation instance. As referenced above, data from the attribute can be checked to determine whether an instance of an invitation complies with invitation-related policies.

InviteTemplateData—this attribute includes key and string Value data elements for locating values for the attribute, such as in a hash table. In at least some implementations, this attribute includes data values that are populated to an invitation template to generate an instance of an invitation.

InviteClaim—this attribute includes the following data elements:

invite: This data element points to a specific instance of an invite that was claimed.

claimDates: This data element indicates one or more dates on which an invitation is claimed.

claimedBy: This data element indicates an individual or other entity that claims an invitation.

EntRef—this attribute includes the following data elements:

ident: This data element identifies an individual and/or entity that issues an instance of an invitation.

authSrc: This data element defines a parent entity for an issuing entity, such as for the entity described by ident.

InviteStatus—this attribute includes the following data elements:

code: This attribute includes an instance of a set of code values that indicate the status of a claim, e.g., ACTIVE, REVOKED, EXPIRED, CLAIMED, and so on.

description: This attribute includes a human readable description of a status code.

According to various embodiments, at least some data elements include sub-elements that further define aspects of an invitation. A non-exhaustive list of examples of such sub-elements is presented below.

UsagePolicy—this data element includes the following sub-elements:

code: This sub-element identifies a particular usage policy or action.

description: This sub-element includes a short human readable description of a desired usage policy behavior.

implProvider: This sub-element includes an identifier for an implementation module to be employed.

configData: This data element enables different usage policies to be defined and configured. For instance, this data element can define a policy that specifies that a claiming individual's email must match an email indicated by issuedToEmail.

EmailTemplate—this data element includes the following sub-elements:

name: This sub-element identifies a particular template for an email used to send an invitation.

locale: This sub-element identifies a locale for a template, e.g., en_US, fr_FR Versions of a templateName can be created for each locale.

At least some of the data components of the data model 1000 are user-configurable, such as via input to various interfaces discussed herein. Data components may also be automatically configured and/or defined by functionalities of the invitation mechanism discussed herein, such as in response to different invitation-related events. The data components can specify various attributes and behaviors for an invitation for specific portions of an invitation lifecycle, such as during invitation creation, invitation send, invitation pending, invitation claiming, and so on. Accordingly, the various data components of the data model 1000 can be employed to configure and manage invitations throughout their life cycle.

Having discussed an example data model, consider now a discussion of an example system and device in accordance with one or more embodiments.

Example System and Device

Figure 11:
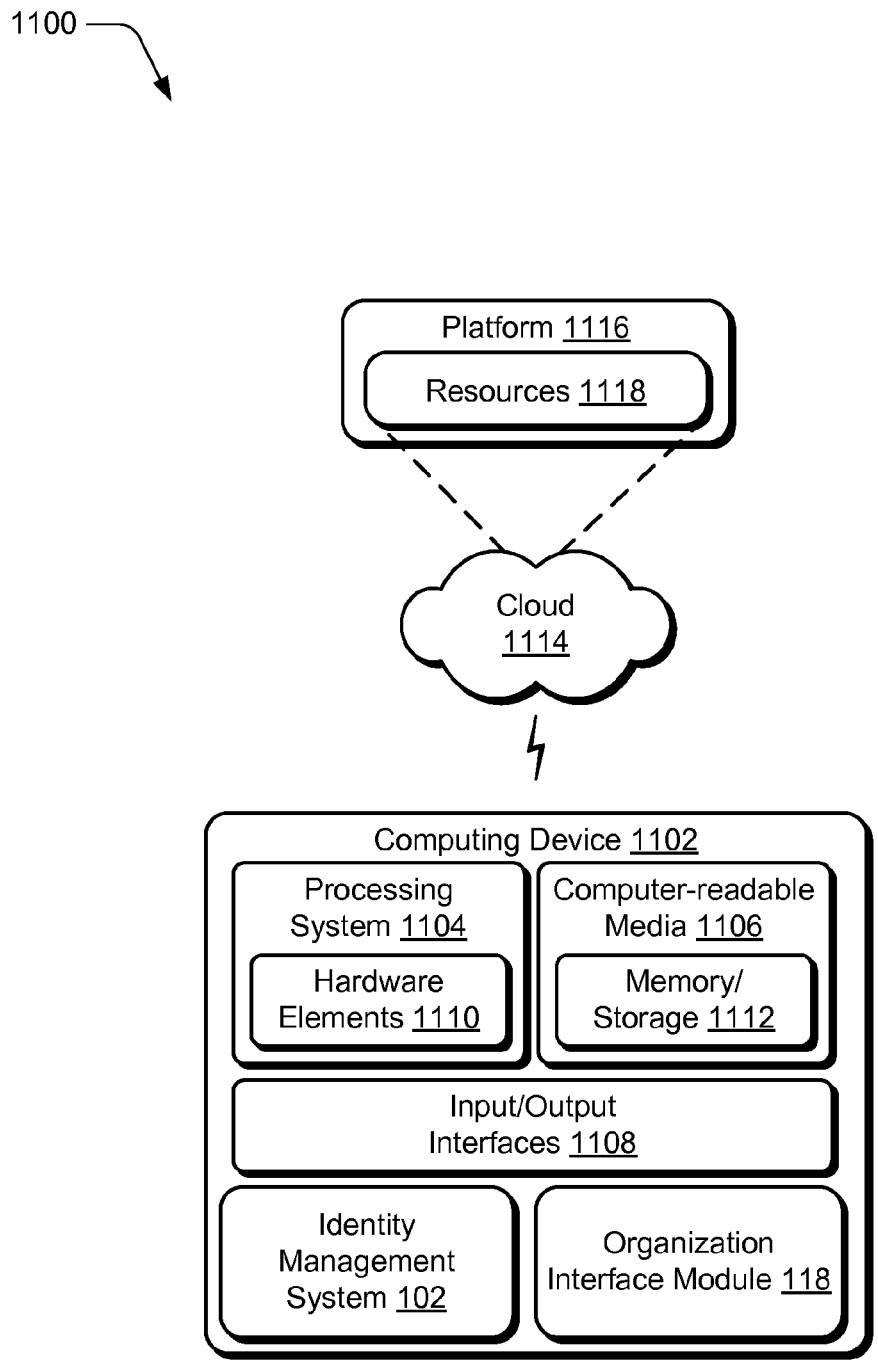
FIG. 11 illustrates an example system and computing device as described with reference to FIG. 1, which are configured to implement embodiments of techniques described herein.

FIG. 11 illustrates an example system generally at 1100 that includes an example computing device 1102 that is representative of one or more computing systems and/or devices that may implement the various techniques described herein. This is illustrated through inclusion of the identity management system 102 and the organization interface module 118, which may be employed to implement techniques for invitations for establishing relationships are described discussed herein. The computing device 1102 may be, for example, a server of a service provider, a device associated with a client (e.g., a client device), an on-chip system, and/or any other suitable computing device or computing system. In at least some implementations, the computing device 1102 represents an example implementation of the identity management system 102 introduced in FIG. 1.

The computing device 1102 as illustrated includes a processing system 1104, one or more computer-readable media 1106, and one or more I/O interfaces 1108 that are communicatively coupled and/or connected, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1106 are illustrated as including memory/storage 1112. The memory/storage 1112 represents memory/storage capacity associated with one or more computer-readable media. The memory/storage 1112 may include volatile media (such as random access memory (RAM)) and/or nonvolatile media (such as read only memory (ROM), Flash memory, optical disks, magnetic disks, and so forth). The memory/storage 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" refer to media and/or devices that enable persistent storage of information in contrast to mere signal transmission, carrier waves, or signals per se. Thus, computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100, the system 1100, and so on.

CONCLUSION

Techniques for invitations for establishing relationships are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. One or more computer-readable storage media comprising instructions stored thereon that, responsive to execution by a computing device, cause the computing device to perform operations comprising:
    generating an invitation to establish a relationship with an entity from an invitation template pre-configured with one or more usage policies, said generating including associating authentication information for a user with the invitation and the invitation representing an electronic document with the authentication information included therein;
    specifying a permitted number of invitations for the relationship that are permitted to be accepted;
    sending the invitation as the electronic document including the authentication information for receipt by the user;
    receiving an indication of acceptance of the invitation and an indication that the user is authenticated to accept the invitation based at least in part on the authentication information;
    receiving an indication of acceptance to a user agreement to at least some of the usage policies, said user agreement comprising user acceptance of one or more terms and conditions for the relationship specified by the usage policies;
    determining that the indication of acceptance is within the permitted number of invitations for establishing the relationship that are permitted to be accepted; and
    establishing the relationship between the user and the entity such that the user is authorized to interact with the entity based on at least some of the usage policies.

2. One or more computer-readable storage media as recited in claim 1, wherein said generating is responsive to a selection of the invitation template from multiple different invitation templates.

3. One or more computer-readable storage media as recited in claim 1, wherein the invitation template is selected based on a role for the user in the relationship.

4. One or more computer-readable storage media as recited in claim 1, wherein the operations further comprise, prior to said sending, receiving input from a different user to the invitation specifying information about the user.

5. One or more computer-readable storage media as recited in claim 1, wherein the user represents an organization, and wherein said relationship enables the user to invite one or more other users to join the organization for purposes of accessing one or more of goods or services provided by the entity.

6. A system comprising:
    one or more processors;
    one or more computer-readable storage media storing computer-executable instructions that, responsive to execution by the one or more processors, cause the system to perform operations comprising:
        receiving selection of an invitation template from a plurality of invitation templates at least some of which are associated with different sets of usage policies;
        generating an invitation from the invitation template, the invitation representing an electronic document;
        receiving input to the invitation specifying parameters for the invitation, the parameters including:
            authentication information for a user to which the invitation is to be directed; and
            an expiration date specifying a maximum pendency time for the invitation; and
        sending the invitation as the electronic document configured with the parameters for receipt by the user to authenticate an identity of the user based on the authentication information, and to invite the user to establish a relationship with an entity based on a set of the usage policies associated with the invitation template.

7. A system as described in claim 6, wherein said receiving selection of the invitation template is based on receiving selection of a role for the user in the relationship.

8. A system as described in claim 6, wherein said relationship comprises a customer relationship between the user and the entity.

9. A system as described in claim 6, wherein the operations further comprise reconfiguring one or more attributes of the invitation subsequent to sending the invitation and prior to the invitation being accepted.

10. A system as described in claim 6, wherein the operations further comprise cancelling the invitation subsequent to sending the invitation such that the invitation cannot be accepted to establish the relationship.

11. A system as described in claim 6, wherein the operations further comprise:
    receiving an indication of acceptance of the invitation; and
    establishing the relationship between the user and the entity responsive to receiving the indication of acceptance and based on the set of the usage policies.

12. A system as described in claim 11, wherein the relationship enables the user to provide one or more other users with access to one or more of goods or services provided by the entity.

13. A computer-implemented method, comprising:
    generating an invitation to establish a relationship with an entity from an invitation template pre-configured with one or more usage policies, said generating including associating authentication information for a user with the invitation and the invitation representing an electronic document with the authentication information included therein;
    specifying a permitted number of invitations for the relationship that are permitted to be accepted and a maximum pendency time for the invitation;
    sending the invitation as the electronic document including the authentication information for receipt by the user;
    receiving an indication of acceptance of the invitation and an indication that the user is authenticated to accept the invitation based at least in part on the authentication information;
    receiving an indication of acceptance to a user agreement to at least some of the usage policies, said user agreement comprising user acceptance of one or more terms and conditions for the relationship specified by the usage policies;

determining that the indication of acceptance is within the permitted number of invitations for establishing the relationship that are permitted to be accepted and that the invitation is accepted within the maximum pendency time; and establishing the relationship between the user and the entity such that the user is authorized to interact with the entity based on at least some of the usage policies.

14. A computer-implemented method as recited in claim 13, wherein the relationship is associated with a particular role for the user, and wherein the permitted number of invitations indicates a permitted number of invitations for the particular role that are permitted to be accepted.

15. A computer-implemented method as recited in claim 13, wherein the invitation is configured such that if the invitation is not accepted within the maximum pendency time, the invitation expires and is no longer valid for acceptance.

16. A computer-implemented method as recited in claim 13, wherein said generating the invitation is performed on behalf of a particular user with a particular role, and wherein the method further comprises determining that the role is permitted to generate the invitation.

17. A computer-implemented method as recited in claim 13, further comprising:

receiving, after said sending, an indication of a reconfiguration of a particular usage policy of the one or more usage policies; and changing the invitation to include the particular usage policy prior to said receiving an indication of acceptance such that the relationship is established based on the particular usage policy.

18. A computer-implemented method as recited in claim 13, wherein the authentication information includes one or more of a cryptographic key, a security token, a password, or biometric data.

* * * * *